Dec. 15, 1931.  H. E. SLOAN ET AL  1,837,174
CHUCK
Filed March 26, 1930
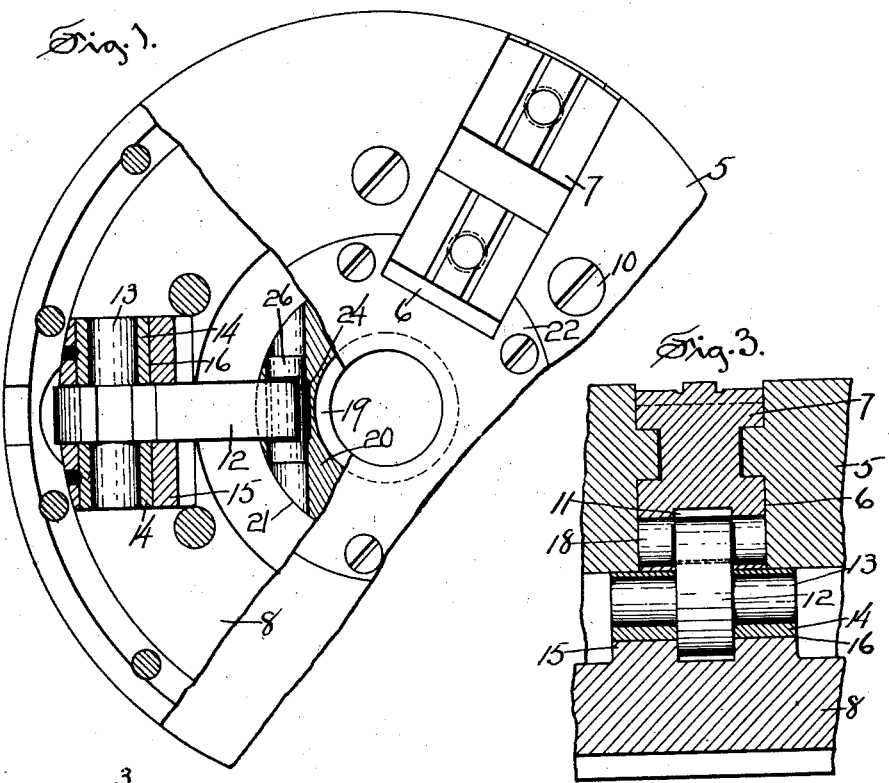
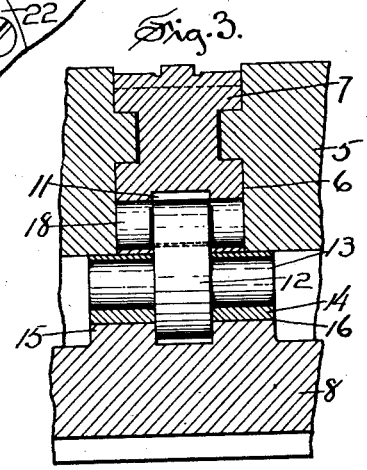
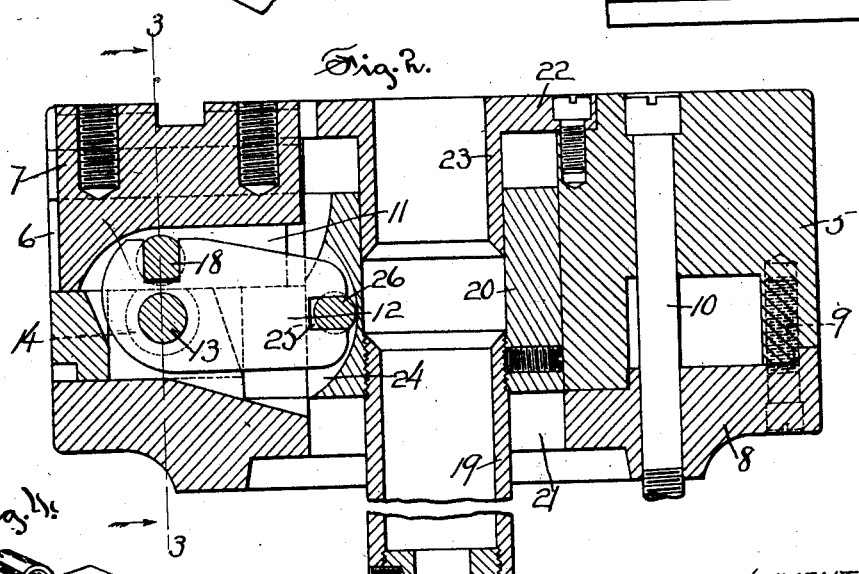
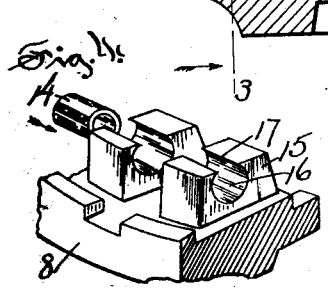
INVENTOR
Harry E. Sloan,
George A. Highberg
By Arthur Jenkins,
ATTORNEY.

Patented Dec. 15, 1931

1,837,174

UNITED STATES PATENT OFFICE

HARRY E. SLOAN, OF HARTFORD, AND GEORGE A. HIGHBERG, OF WEST HARTFORD, CONNECTICUT, ASSIGNORS TO THE CUSHMAN CHUCK COMPANY, OF HARTFORD, CONNECTICUT, A CORPORATION OF CONNECTICUT

CHUCK

Application filed March 26, 1930. Serial No. 438,989.

Our invention relates more particularly to means for opening and closing the jaws of a chuck of that type having grooves in which the jaws are mounted to move radially on the face of said chuck, and an object of our invention, among others, is to provide a simple and efficient means for effecting radial movement of said jaws which means are of sturdy and rigid construction and which may be readily assembled within the body of the chuck.

One form of a chuck embodying our invention and in the construction and use of which the objects herein set out, as well as others, may be attained, is illustrated in the accompanying drawings, in which—

Figure 1 is a face view of a chuck embodying our improvement with parts broken away to show construction.

Figure 2 is a view in central section on a plane along the axis of the chuck body.

Figure 3 is a view in section on a plane denoted by the dotted line 3—3 of Figure 2.

Figure 4 is a detail isometric view illustrating the manner of assembling the jaw operating levers in the chuck body.

Our invention illustrated and described herein, although not limited in its application, is particularly applicable in that form of chuck wherein the jaws are movable radially in slots or grooves on the face of the chuck body, such a chuck body being denoted by the numeral 5 in the accompanying drawings, and which slots or grooves are denoted by the numeral 6. These slots or grooves extend radially in the chuck body, and in that particular type of chuck shown herein, they are three in number. A base 7 for each chuck jaw is mounted in each slot for reciprocating sliding movement therein, each base being provided with any suitable means for attachment of a chuck jaw thereto, the latter being omitted from the showing herein.

A back plate 8 is secured to the rear face of the chuck body, as by means of screws 9, and such body may be provided with screws 10 as a means for securing the chuck body in place on a rotating member (not herein shown) secured to a chuck spindle in a manner common to chucks of this class.

Each of the jaw bases 7 has a groove 11 formed in its under surface within which one edge of a jaw operating lever 12 is located, said lever having lever supporting studs 13 projecting from opposite sides thereof and into sleeves 14 mounted in pillow blocks 15 secured to and projecting inwardly from the back plate 8. The openings 16 in which the sleeves 14 are located cut through the tops of the blocks, creating slots 17. The sleeves 14 are of such sizes that they cannot pass through said slots, but the sizes of the studs 13 are such that they may be passed through said slots. This construction is for the purpose of permitting the parts to be assembled, the studs 13 being passed laterally through the slots 17 and the sleeves 14 then being passed by an endwise movement onto the studs within the openings 16.

The studs are preferably formed integral with the levers, each of which is engaged with a jaw actuating pin 18 secured to the base 7 and extending across the groove 11 therein. Each lever has a notch with parallel edges engaged with opposite sides of the pin 18, which opposite sides are flattened to provide an extensive wearing surface and the ends of the pins are rounded so that they may turn in their bearings to permit a slight rocking movement of the levers 12.

An actuating sleeve 19 projects into a jaw actuator 20, being secured thereto in any suitable manner, as by means of interengaging screw threads. The opposite end of the sleeve is adapted to be engaged with any suitable mechanism for imparting endwise movement to the sleeve, which mechanism will be readily understood by those skilled in the art without further illustration herein.

Said actuator is slidably mounted in a hole 21 in the chuck body 5, said hole at the face of the chuck body being closed as by a plate 22 having a neck 28 projecting into a hole through the jaw actuator 20. This actuator has a number of grooves 24, one for each of the levers 12, one end of each lever projecting into a groove and having a notch 25 engaged with a pin 26 extending across one of the grooves 24. Each of the pins 26 is flattened on opposite sides to engage parallel edges of one of the notches 25 to afford an extensive wearing surface and as hereinbefore described with respect to the actuating pins 18.

The operation of the device will be readily understood, it being noted that lengthwise movement being imparted to the sleeve 19, the jaw actuator 20 will be moved to rock the levers 12, thereby moving the chuck jaws on the jaw bases 7 toward or from the axial center of the chuck.

In accordance with the provisions of the patent statutes we have described the principles of operation of our invention together with the device which we now consider to represent the best embodiment thereof; but we desire to have it understood that the device shown is only illustrative and that the invention may be carried out by other means and applied to uses other than those above set out.

We claim:

1. A chuck comprising a body, a chuck jaw movably mounted in said body, a separately formed actuating pin having flattened sides rotatably mounted in a chuck jaw member, an operating lever having a notch with parallel edges to engage the flattened sides of said pin, and means for actuating said lever.

2. A chuck comprising a body, a chuck jaw movably mounted in said body, a chuck jaw base having a groove in its under surface, a separately formed actuating pin rotatably mounted in said body and extending across said groove, a chuck jaw operating lever pivotally mounted in said body and extending into said groove and having a notch to receive said pin, and means for operating said lever.

3. A chuck comprising a body, a chuck jaw member movably mounted in said body, a separately formed chuck jaw actuating pin having oppositely arranged flattened sides projecting across a groove extending lengthwise of and in the under side of said chuck jaw member, a chuck jaw operating lever pivotally mounted in said body with one edge extended into and housed in said groove and having a notch to receive said pin, and means for operating said lever.

4. A chuck comprising a body having an annular chamber therein, a back plate closing said chamber, pillow blocks arranged in pairs projecting from said back plate and having bearing openings cutting through the ends of the blocks, thereby providing slots, bearing sleeves in said bearing openings, a chuck jaw operating lever pivotally mounted in the sleeves in each pair of blocks, a chuck jaw member movably mounted on said body and engaged with each of said levers, and means for operating said levers.

5. A chuck comprising a body having an annular chamber therein, pillow blocks located in said chamber and arranged in pairs having bearing openings cutting through the tops of said blocks, sleeves located in said openings and larger in diameter than the slots in the ends of the blocks, chuck jaw operating levers, studs integrally formed with each lever and projecting from opposite sides thereof and of a size to pass through the slots in the ends of the blocks, a connection between said lever and a chuck jaw member, and means for operating said lever.

6. A chuck comprising a body having an axial opening therein, chuck jaws movably mounted in said body each comprising a member having a groove in its under surface, a flat sided pin projecting across each groove and rotatably mounted in openings in the walls thereof, a lever pivotally mounted in the body and having a notch to receive one of said pins, a chuck jaw actuator slidably mounted in said axial opening and having radially formed grooves, a flat sided pin extending across each of said last-mentioned grooves and engaged with a notch in the end of said lever, and means for operating said actuator.

7. A chuck comprising a body, a chuck jaw movably mounted in said body, a chuck jaw actuator mounted in said body, and a connection between said actuator and said chuck jaw including a lever pivotally supported by the chuck body and having a notch with straight sides engaged with the opposite flat sides of a separately formed actuating pin extending across a groove in the engaged member.

8. A chuck comprising a body having an axial opening therein, an actuator slidably mounted in said opening, an actuating member secured to the actuator and projecting outwardly through an axial opening in the rear of said body, said actuator having slots to receive and house the ends of actuating levers, chuck jaws radially movable in said chuck body and having lengthwise extending grooves in their under surfaces to receive and house the upper edges of said levers, and actuating levers pivotally mounted in the body and extending lengthwise along said grooves and engaged with said actuator and said jaws, each connection embodying a separately formed pin pivotally mounted in its supporting member and having flat sides engaging opposite sides of the notches in said levers.

HARRY E. SLOAN.
GEORGE A. HIGHBERG.